United States Patent [19]

Peachey

[11] Patent Number: 4,512,334
[45] Date of Patent: Apr. 23, 1985

[54] PORTABLE THERMAL EXCHANGE SYSTEM

[75] Inventor: Kenneth G. Peachey, Mt. Crawford, Va.

[73] Assignee: Sunwood Energy Products, Inc., Harrisonburg, Va.

[21] Appl. No.: 489,462

[22] Filed: Apr. 28, 1983

[51] Int. Cl.³ .............................................. F24J 3/02
[52] U.S. Cl. .................................. 126/430; 126/429; 126/417
[58] Field of Search ............... 126/430, 431, 432, 417, 126/428, 429, 436, 451

[56] References Cited

U.S. PATENT DOCUMENTS

| | | | |
|---|---|---|---|
| 4,212,289 | 7/1980 | Hebert | 126/430 X |
| 4,239,032 | 12/1980 | Irving | 126/437 |
| 4,271,824 | 6/1981 | Decker | 126/400 X |
| 4,284,067 | 8/1981 | Kilar | 126/436 |
| 4,290,416 | 9/1981 | Maloney | 126/431 X |

*Primary Examiner*—Larry Jones
*Attorney, Agent, or Firm*—Mason, Fenwick & Lawrence

[57] ABSTRACT

A portable thermal collector and storage apparatus is disclosed as comprising a container for receiving a phase change material for selectively absorbing and emitting thermal energy, a base for supporting the phase change container with respect to a floor surface, and a set of wheels or rollers mounted on the base for facilitating the movement of the base and the phase change container from a first, thermal absorbing location to a second, thermal emitting location. In a further aspect of this invention, the thermal collector and storage apparatus includes a tabletop for receiving and supporting the phase change container. The tabletop includes a plate for presenting a table surface, and is made of a material transmissive to solar radiation, whereby solar radiation may be directed through the plate and onto the phase change container.

7 Claims, 4 Drawing Figures

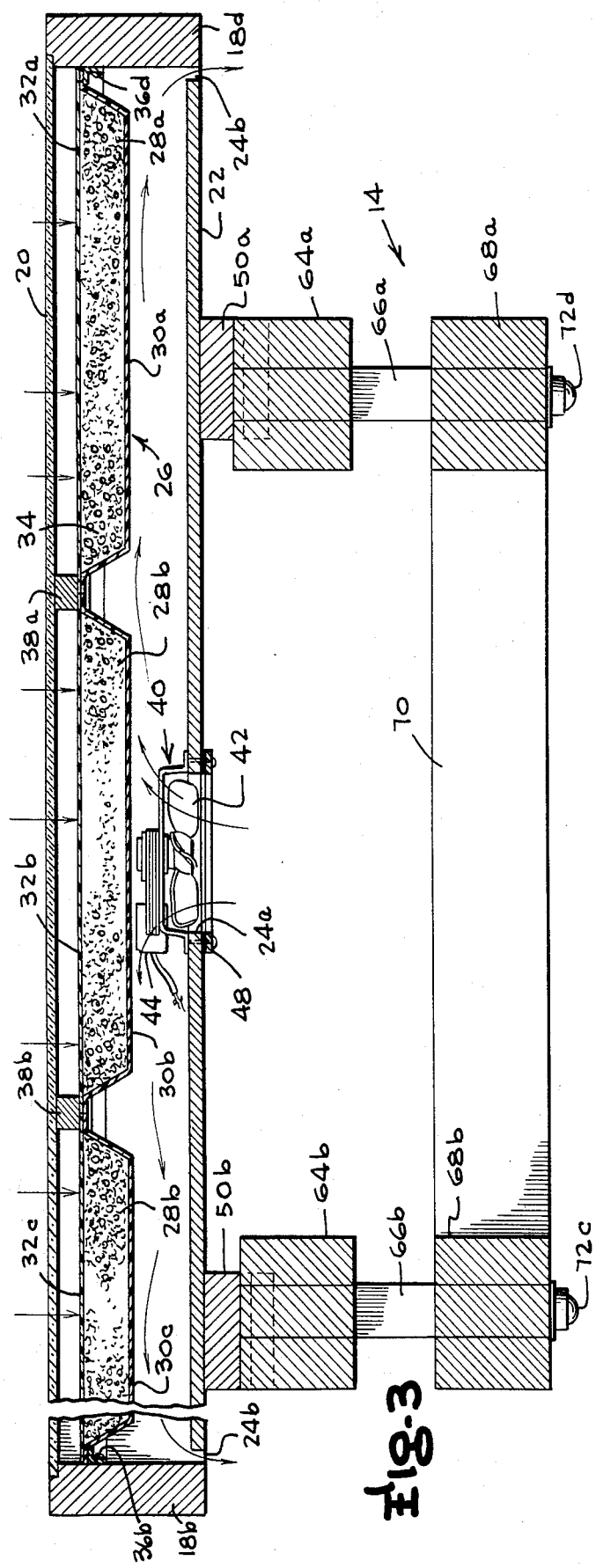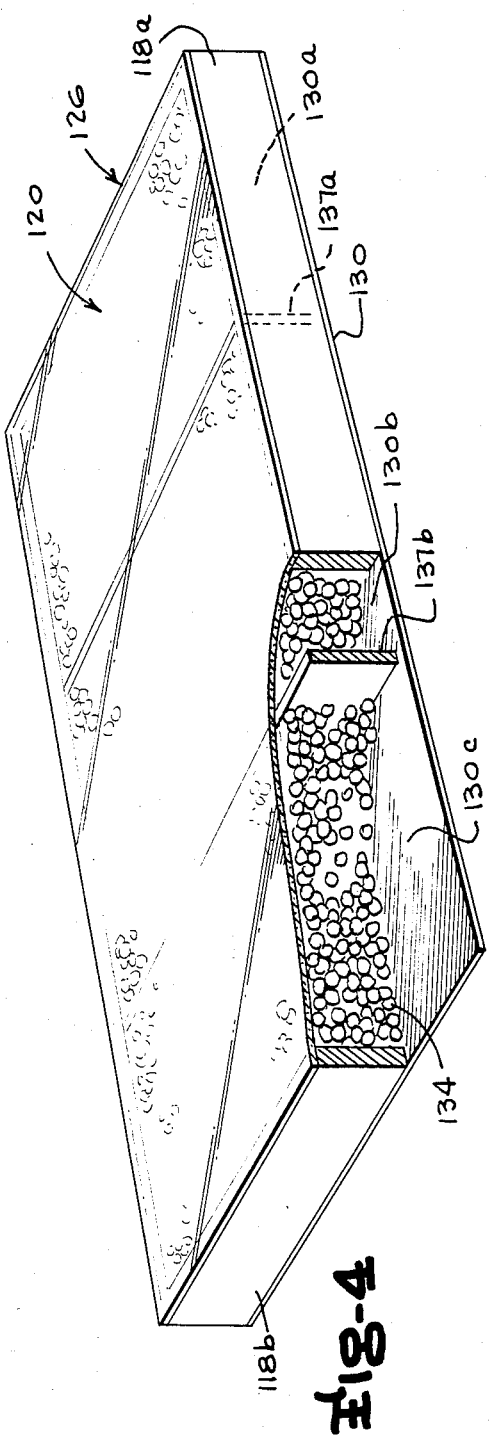

PORTABLE THERMAL EXCHANGE SYSTEM

FIELD OF THE INVENTION

The present invention relates to thermal exchange systems for absorbing and storing thermal energy, e.g., solar energy and, thereafter, for controlling the release of the stored energy into a confined space such as a house. More specifically, this invention relates to portable, thermal exchange systems as would be capable of being disposed to most favorably absorb solar energy and, thereafter, being moved within the enclosure to be heated.

DESCRIPTION OF THE PRIOR ART

As the cost of basic, fossil fuels increases, the popularity and use of solar energy heat exchanger systems increases. The prior art includes solar heat exchange systems such as disclosed in U.S. Pat. Nos. 4,144,931 and 4,217,884, each of which includes a plurality of heat exchange elements or vanes. The heat exchange elements are adapted to receive a flow of a heat absorbing medium such as water that is directed via a suitable conduit system to either a storage tank or to the enclosure to be heated. It is apparent that such heat exchange systems employing conduits require extensive and expensive modification to the enclosure (such as a house) to be heated. Typically, remote storage tanks and conduits have to be installed within the enclosure. For example, U.S. Pat. No. 4,217,884 discloses the use of a collector box that is mounted upon the roof of a house and includes a plurality of absorber tubes disposed in an array to receive solar energy as reflected from a reflective surface. Such a system would require a suitable mounting structure for the collector box upon the roof of the house, as well as conduits leading from the absorber tubes to a suitable heat storage mechanism.

A similar rooftop system is disclosed in U.S. Pat. No. 4,223,664, which describes a collector assembly of absorber tubes mounted upon a roof having a plurality of conduits disposed within the collector assembly. Each of the absorber tubes so mounted is associated with a conduit system to permit a pump to direct the heat storage medium to a remote location. Both of the above-described heat exchange systems require means for storing a heat absorbing fluid as passed through its absorber tubes, which may require massive trompe walls, water tanks or the equivalent.

The expense of installing conduit systems, water tanks and pumps may be avoided by the use of selfcontained heat exchange system such as suggested by U.S. Pat. No. 4,212,289, which discloses a solar shutter or blind that is mounted at the sides of existing windows of the house to be heated. Such a shutter comprises a horizontal array of overlapping slats or vanes, each vane having a plurality of channels for encapsulating a phase transformable heat storing medium such as certain salt hydrates. The salt hydrates have melting temperatures high enough above room temperature to promote efficient convection and radiation heat exchange with the room to be heated, and yet low enough to prevent over heating of the room. Such phase change materials operate by having a latent heat of fusion related to its transition from a solid form to a liquid form at a melting temperature typically in the order of 90°–110° F. The shutters as described by U.S. Pat. No. 4,212,289 may be supported by hinges in a conventional fashion, whereby the shutters may be rotated from a first position wherein the windows are exposed to solar energy and the shutters absorb heat, to a second or closed position covering the windows. In the second position, the absorbed heat is released or exchanged through the windows and into the home to be heated. Alternatively, such shutters may be disposed upon rails to permit sliding between window blocking and unblocking positions.

In co-pending application Ser. No. 298,295, filed Aug. 31, 1981 in the name of the applicant of this invention, there is described a self-contained thermal collector and storage system comprised of a plurality of energy storage elements or rods mounted in a parallel array. The array of storage rods is self-contained within a frame-like enclosure, which is adapted to be readily built into a wall of a house. Each storage rod contains a heat phase transformable medium such as one of the eutectic salts, e.g., calcium chloride hexahydrate. Each storage rod of the array includes an insulating element that is disposable between a first position, wherein the solar energy lost to the exterior of the house is retarded, and a second position, wherein solar energy may be directed onto its storage rod. In addition, means in the form of a fan are provided to direct air through an input port into the enclosure, over the array of storage rods, thus, absorbing heat to be discharged as heated air into the room to be heated.

SUMMARY OF THE INVENTION

It is an object of this invention to provide a new and improved heat exchange system that may be readily employed without modification of the enclosure to be heated.

It is still further object of this invention to provide a new and improved solar energy transfer system that is portable from a first position exposed to solar energy whereby the solar energy is absorbed and stored, to a second position within the housing to be conditioned, wherein the absorbed energy is transferred to condition or heat the housing.

In accordance with these and other objects of this invention, there is disclosed a portable thermal collector and storage apparatus comprising a container for receiving a phase change material for selectively absorbing and emitting thermal energy, a base for supporting the phase change container with respect to a floor surface and a set of wheels or rollers mounted on the base for facilitating the movement of the base and the phase change container from a first, thermal absorbing location to a second, thermal emitting location. In a further aspect of this invention, the thermal collector and storage apparatus includes a tabletop for receiving and supporting the phase change container. The tabletop includes a plate for presenting a table surface, and is made of a material transmissive to solar radiation, whereby solar radiation may be directed through the plate and onto the phase change container.

BRIEF DESCRIPTION OF THE DRAWINGS

A detailed description of a preferred embodiment of this invention is made in conjunction with the following drawings in which like references are used in the different Figures for illustrating the same elements:

FIG. 3 is a sectioned view of the portable heat exchange system as taken along line 3—3 as shown in FIG. 2; and FIG. 4 is a perspective view of an alternative embodiment of the thermal energy storage assembly of this invention.

DETAILED DESCRIPTION OF INVENTION

Figure 1:
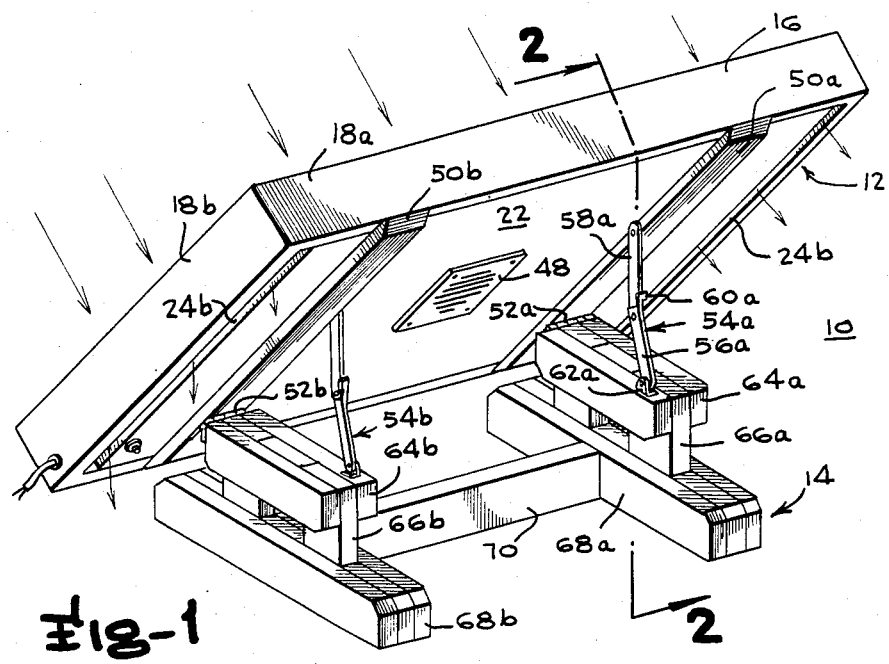
FIG. 1 is a perspective view of the portable heat exchange system in accordance with the teachings of this invention.

Referring now to the drawings and, in particular, to FIG. 1, there is shown a portable thermal exchange system generally identified by the numeral 10 in accordance with the teachings of this invention. The system 10 includes a tabletop 12 pivotally mounted by a pair of hinges 52a and 52b upon a support system base generally indicated by the numeral 14. As particularly illustrated in FIG. 2, the tabletop 12 is disposable between a first or horizontal position as shown in full line in FIG. 2 and a second or tilted position as shown in dotted line. A pair of lockable braces 54a and 54b serve to retain the tabletop 12 in its tilted position.

Figure 2:
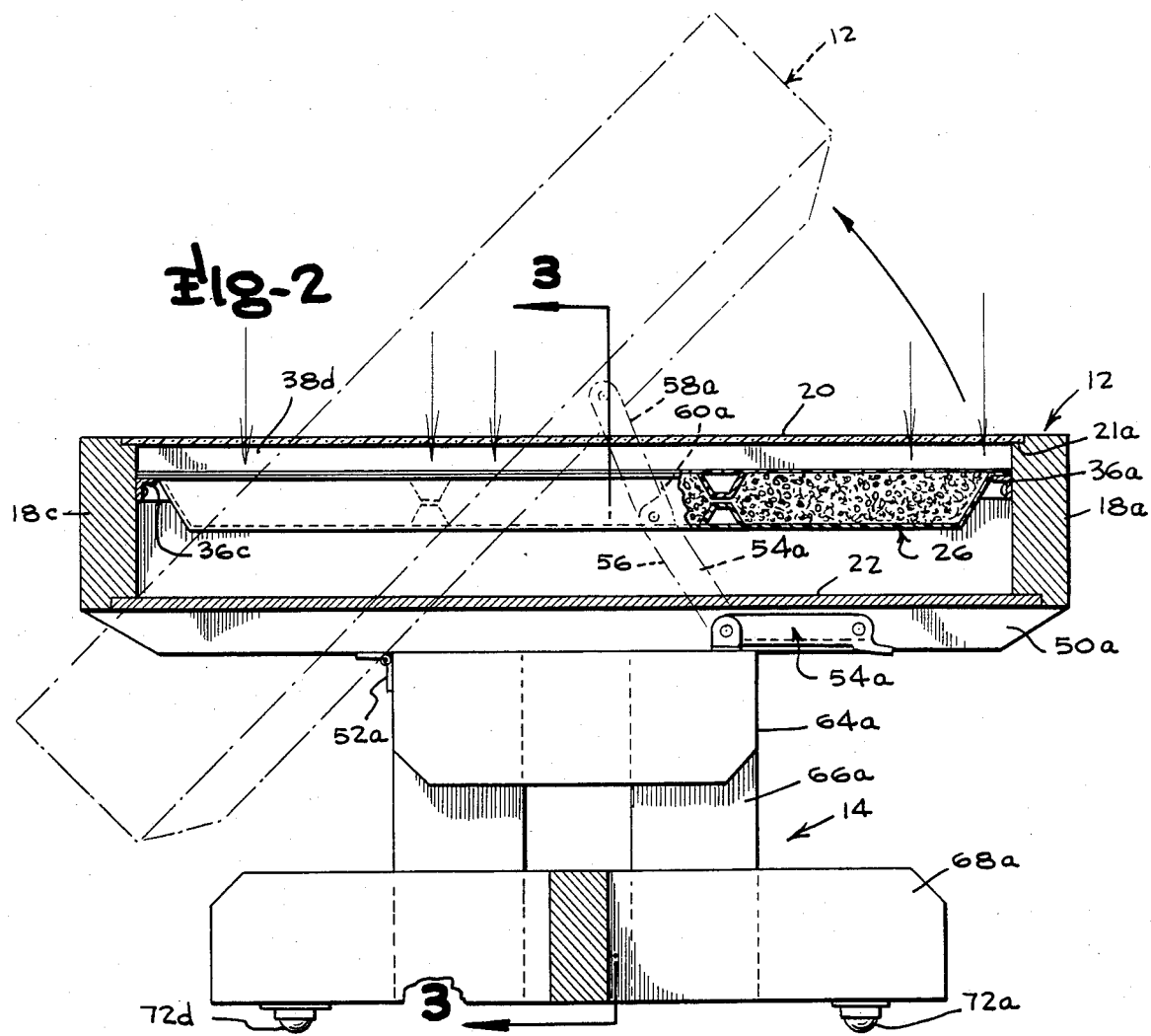
FIG. 2 is a sectioned view of the portable heat exchange system as taken along lines 2—2 as shown in FIG. 1.

As particularly illustrated in FIGS. 2 and 3, the tabletop 12 includes a rectangularly-shaped frame 16 comprised of side members 18a, b, c, and d. A top surface of the tabletop 12 is formed by a plate 20 made up of a suitable material transmissive to solar energy such as a low iron, solar glass, as manufactured by Hordis Brothers, Inc. The plate 20 is disposed within corresponding flanges 21 of the side members 18. A heat absorbing material in the form of a suitable phase change material and is contained within a container assembly 26 comprised of a plate-like lid 32 and a bottom container portion 30 that is shaped to form a plurality of containers 30a, 30b and 30c. The lid 32 and the bottom container portion 30 are made of a high density polyethylene to prevent either the escape of the phase change material or introduction of moisture. Each of the containers 30a, 30b and 30c form are covered with a corresponding portion 32a, 32b or 32c of the lid 32 to encapsulate the phase change material. The phase change material may illustratively be comprised of calcium chloride hexahydrate as manufactured by Dow Chemical Company under their designation CEST 81. The periphery of the container assembly 26 is secured by four flanges 36a, 36b, 36c and 36d to corresponding of the side members 18a, 18b, 18c and 18d. A plurality of dividers 38a and 38b are disposed across the width dimension of the tabletop 12 as shown in FIG. 2 to space and to support the container assembly 26 within the frame 16 with respect to the plate 20.

As shown in FIG. 1, the bottom of the tabletop 12 is formed of a bottom member 22, having a length dimension slightly less than that of the tabletop 12, whereby output ports 24b are formed to permit the escape of conditioned air from the tabletop 12. Air is forced within the frame 16 through an input port 24a by a convection drive mechanism 40. The mechanism 40 is comprised of an electric motor 44 that rotatively drives a fan 42. The convection drive mechanism 40 is mounted to direct air through the input port 24a within the bottom member 22 and across the bottom container portion 30 of the container assembly 26, thereby absorbing heat from the phase change material before being discharged through the output ports 24b. A vent 48 covers the fan 42 while permitting the introduction of relatively cool air within the frame 16. A pair of ribs 50a and 50b is disposed transversely across the bottom member 22 of the tabletop 12 to add structural strength to the bottom member 22 and to provide a surface to attach one portion of the corresponding hinges 52a and 52b.

As shown in FIGS. 1 and 3, the support system base 14 comprises a pair of upper support members 64a and 64b supported respectively by pairs of legs 66a and 66b. The pair of legs 66a extends vertically upward of its foot member 66a, whereas the pair of legs 66b extends upwardly from its foot member 68b. As shown in FIG. 1, the foot members 68a and 68b are disposed substantially parallel with each other and are interconnected by a cross brace 70 to form a structurally strong, H-shaped member. As shown in FIGS. 2 and 3, each of the foot members 68a and 68b has a pair of rollers 72 disposed at either end of its foot member 68. The rollers 72 permit the entire portable thermal exchange system 10 to be moved between desired locations, as will be explained.

As particularly illustrated by FIGS. 1 and 2, the lockable braces 54a and 54b are attached respectively by flanges 62a and 62b to the upper support members 64a and 64b. Each lockable brace 54 includes a pair of arms 56 and 58 rotatably connected together. The upper end of the arm 58 is rotatable affixed to the rib member 50, whereas the lower end of the arm 56 is rotatable affixed to the flange 62. As particularly illustrated in FIG. 2, the lower arm 56 includes a locking catch 60 that engages the upper edge surface of the arm 58, thus, locking the brace 54 in position to support the tabletop 12 in its second, tilted position. The lockable brace 54 may be rotated clockwise as shown in FIG. 2 to its unlocked position as shown in full time, whereby the tabletop 12 may be disposed to its first, horizontal position.

An alternative embodiment of the container assembly identified by the numeral 126 is shown in FIG. 4. The assembly 126 is of a rectangular configuration having four side members 118a, 118b, 118c and 118d interconnected to form a frame for receiving the phase change material in the form of salt pellets or tablets 134. The pellets 134 are comprised of glauber salt as individually encapsulated by a tar envelope as manufactured by the Penwalt Corporation. Top and bottom plates 120 form respectively the top and bottom of the container assembly 126. A pair of dividers 137a and 137b is disposed across the assembly 126 to form a plurality of modules 130a, 130b and 130c for receiving the pellets 134, thereby, preventing the weight of the pellets 134 from crushing each other when the tabletop is disposed to its tilted position. The top plate 120 is made of a light transmissive material such as glass to permit the sun rays to impinge on the pellets 134. The bottom plate 130 may be illustratively made of a suitable thermal or heat conductive material such as aluminum to permit efficient heat radiation.

The phase change material in the form of pellets 134 of an eutectic salt effect the absorption and selective release of thermal energy because the eutectic salt has a melting temperature selected to permit efficient convection and radiation heat exchange into the environment or room to be heated. In other words, the melting temperature must be sufficiently above the room temperature to permit the desired heat exchange, and, yet, low enough to prevent over heating of the room. In a thermal absorbing mode, the phase change material is heated by solar energy, for example, to its melting temperature and is changed from its solid to its liquid state upon the absorption of a quantity of heat equal to its latent heat of fusion. In a second mode of operation, the phase change material after absorbing thermal energy and being converted to its liquid state is disposed within an environment to be heated. As the phase change material is converted from its liquid to its solid state, its latent heat of fusion is given up thereby heating the room.

The portable heat exchange system of this invention is particularly adapted to heat any of a variety of spaces and may be readily moved from a first location, wherein its tabletop 12 and, in particular, its container assembly 26 is exposed to solar energy. In particular, solar energy is transmitted through the plate 20, whereby the phase change material 34 is converted from its solid to liquid state, thus, absorbing the thermal energy. The tabletop 12 may be disposed selectively either in its first, horizontal position or its second, tilted position to most effectively absorb the solar energy. In addition, the portable nature of the system 10 due to the incorporation of the rollers 72 permits the tabletop 12 to be oriented to optimally receive solar energy, i.e., the solar rays as indicated by arrows in FIGS. 1 and 3 strike the plate 20 substantially perpendicularly. After ther thermal energy has been absorbed by the phase change material 34 and it has been transformed to its liquid state, the system 10 may be readily transported due to its rollers 72 to the space to be conditioned. Typically, the system 10 is disposed within a room to be heated. As the phase change material 34 returns to its solid state, its latent heat of fusion is released thereby heating the room. The heat exchange may be either by convection or conduction. Convection is assisted by the convection drive mechanism 40. Though not shown, the motor 44 may include a switch, whereby the motor is energized to rotate the fan 42, thus, circulating air through the input port 24a, over the container assembly 26 and through the output ports 24b, whereby the heated air is circulated into the room to be heated. Though not shown, the motor 44 may be thermostatically controlled with any of a variety of well-known temperature sensitive controls such as Model No. KBMC-13B and manufactured by KB Electronics, Inc. The tabletop 12 may be disposed in either its first, horizontal position or its second, tilted position to effect radiant discharge, but preferably should be disposed in its first, horizontal position to permit heat transfer by forced convection. It is understood that when the table-top 12 is disposed of in its first, horizontal position, that the distribution of heated air from the output ports 24b will be more even.

In addition to permitting a readily usable heat exchange system without any adaptation of the environment or house to be heated, the portable thermal exchange system 10 also serves as a table, thus, providing not only a support surface of its plate 20, but also providing the conditioning function as explained above.

In considering this invention, it should be remembered that the present disclosure is illustrative only and the scope of the invention should be determined by the appended claims.

I claim:

1. Dual functioning apparatus for collecting and storing thermal energy and for serving as a table, said apparatus adapted to be readily moved along a floor surface from a first, thermal absorbing location to a second, thermal emitting location, said apparatus comprising:
   (a) phase change means for selectively absorbing and emitting thermal energy;
   (b) base means for supporting said phase change means;
   (c) transport means mounted on said base means for facilitating the movement of said base means and said phase change means from the first to the second locations;
   (d) a tabletop for receiving and supporting said phase change means and including a plate for presenting a table surface, said plate comprised of a material transmissive to solar radiation, whereby solar radiation may be directed through said plate and onto said phase change means; and
   (e) means for adjustably mounting said table top with respect to said base means, whereby said table top may be disposed from a first orientation with respect to the floor surface to a second orientation with respect to the floor surface.

2. The dual functioning apparatus as claimed in claim 1, wherein said mounting means includes a hinge for permitting the rotation of said phase change means with respect to said base means, and lock means for fixably disposing said phase change means in said second orientation.

3. The dual functioning apparatus as claimed in claim 1, wherein said tabletop supports said phase change means at a distance from said plate to ensure said plate is thermally insulated from said phase change means.

4. The dual functioning apparatus as claimed in claim 3, wherein said tabletop includes a frame forming a space therein and said plate mounted upon said frame to provide said table surface, and said phase change means comprises a container for receiving a phase change material disposed within said frame in a position to receive radiation directed through said plate.

5. The dual functioning apparatus as claimed in claim 4, wherein said container is made of a thermal conducting material and said phase change material comprises salt pellets.

6. The dual functioning apparatus as claimed in claim 5, wherein there is included convection drive means associated with said tabletop for directing air from the ambient environment past said container thereby absorbing thermal energy to be redirected into the ambient environment.

7. The dual functioning apparatus as claimed in claim 6, wherein there is included a bottom member comprising an input port and an output port, said convection drive means disposed to direct air through said input port past said container to be exited through said output port.

* * * * *